United States Patent
Elliott et al.

(10) Patent No.: US 6,243,223 B1
(45) Date of Patent: Jun. 5, 2001

(54) DISK DRIVE WITH SERVO BURST PHASING FOR IMPROVED LINEARITY AND OFF-TRACK PERFORMANCE WITH A WIDE READING TRANSDUCER

(75) Inventors: Timothy J. Elliott, Huntington Beach; Steven M. Reiser, Aliso Viejo, both of CA (US)

(73) Assignee: Western Digital Corporation, Lake Forest, CA (US)

( * ) Notice: Subject to any disclaimer, the term of this patent is extended or adjusted under 35 U.S.C. 154(b) by 0 days.

(21) Appl. No.: 09/007,698

(22) Filed: Jan. 15, 1998

(51) Int. Cl.$^7$ .................................................. G11B 5/596
(52) U.S. Cl. ...................... 360/77.08; 360/77.02
(58) Field of Search .................... 360/48, 77.08, 360/77.05, 77.02

(56) References Cited

U.S. PATENT DOCUMENTS

| | | |
|---|---|---|
| 4,890,172 | 12/1989 | Watt et al. . |
| 5,182,682 * | 1/1993 | Weispfenning et al. ...... 360/77.05 X |
| 5,341,255 | 8/1994 | Starr et al. . |
| 5,923,492 * | 7/1999 | Liikanen ........................... 360/77.08 |

* cited by examiner

Primary Examiner—Alan T Faber
(74) Attorney, Agent, or Firm—Milad G Shara (57) ABSTRACT

A disk drive has a sampled servo system controller and a disk with a plurality of angularly spaced servo wedges. Each of the servo wedges contains angularly aligned servo burst fields that are radially adjacent to one another and spaced apart by an erase field. In order to eliminate or minimize servo position signal errors caused by a wide-reading transducer head encountering signals from both of a pair of angularly aligned servo burst fields, the servo burst fields are recorded in opposing phase.

7 Claims, 11 Drawing Sheets

FIG. 3
(SENSITIVITY OF IDEAL READ TRANSDUCER)

FIG. 4
(SENSITIVITY OF TYPICAL MR HEAD)

FIG. 5
(SENSITIVITY OF TYPICAL INDUCTIVE HEAD)

DISK DRIVE WITH SERVO BURST PHASING FOR IMPROVED LINEARITY AND OFF-TRACK PERFORMANCE WITH A WIDE READING TRANSDUCER

BACKGROUND OF THE INVENTION

1. Field of the Invention

The present invention relates generally to rotating magnetic disk drives and, more particularly, to a disk drive having an improved servo burst pattern that better accommodates a wide reading transducer and a wider range of transducer widths.

2. Description of the Related Art

In a conventional disk drive, each surface of each disk contains a plurality of concentric data tracks angularly divided into a plurality of data sectors. In addition, special servo information is provided on this disk or another disk to determine the position of the head. The most popular form of servo is called "embedded servo" wherein the servo information is written on this disk in a plurality of servo sectors that are angularly spaced from one another and interspersed between data sectors around the track. Each servo sector generally comprises a track identification (ID) field and a group of servo bursts which the servo control system samples to align the transducer head with or relative to a particular data track. Each servo burst is conventionally formed from a series of magnetic transitions defined by an alternating pattern of magnetic domains.

The servo control system moves the transducer toward a desired track during a coarse "seek" mode using the track ID field as a control input. Once the transducer head is generally over the desired track, the servo control system uses the servo bursts to keep the transducer head over that track in a fine "track follow" mode. The transducer generally reads the servo bursts to produce a position error signal (PES) that is 0 when the transducer is at a particular radial position. The position where the PES=0 may or may not be at the data track center, however, depending on the magnetic characteristics of the transducer, the arrangement of the servo bursts, and the formula used to calculate the PES.

In all drives, the write transducer's width defines the very minimum data track pitch. The servo information, therefore, must define a data track pitch that is slightly wider than the write transducer. The data track pitch is typically defined to be about 125% wider than the nominal width of the write transducer and conversely, therefore, the write transducer is about 80% of the track pitch. The exact percentage will vary somewhat from 80%, from drive to drive, since the width of the write transducer will vary from nominal due to normal manufacturing distributions.

Figure 1:
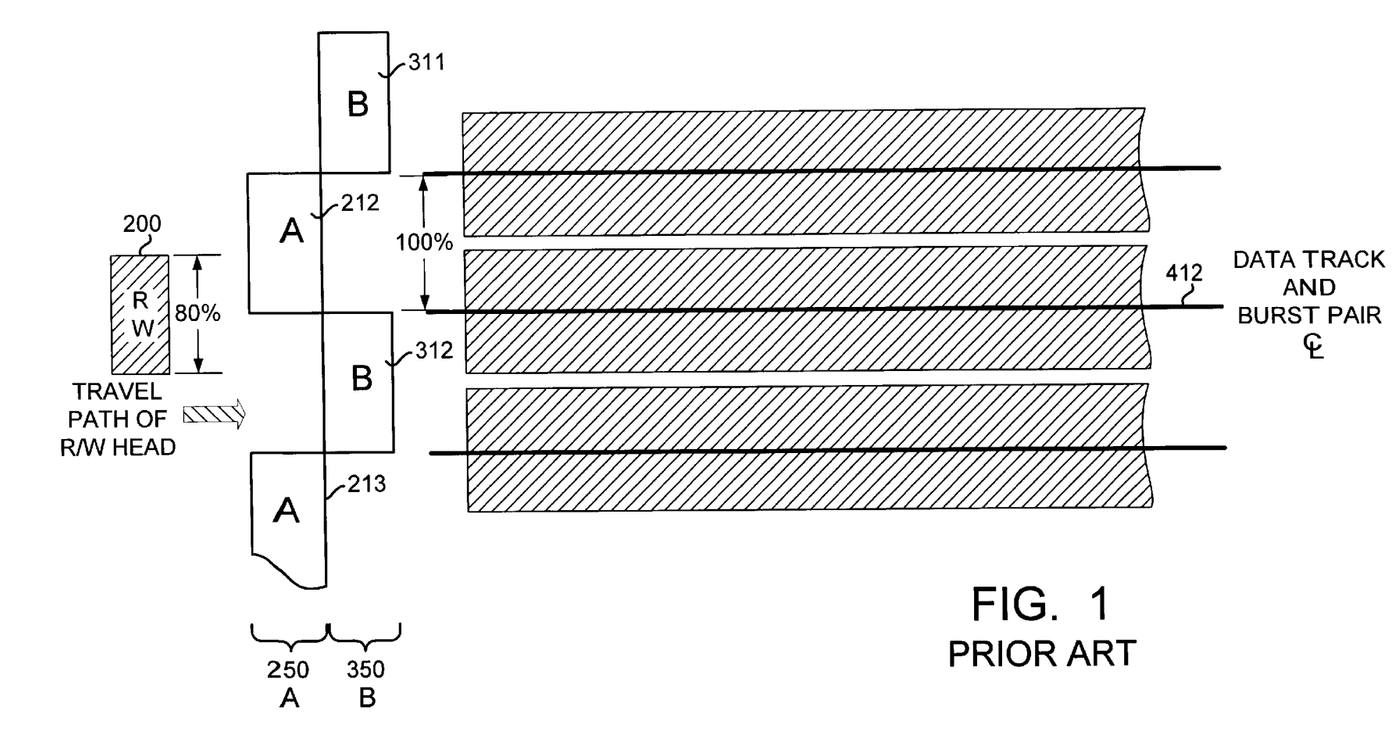
FIG. 1 schematically represents a prior art drive that uses only two circumferentially successive A and B bursts 212, 312 per data track 412 and an inductive head in which the same transducer 200 both reads and writes data.
Figure 6:
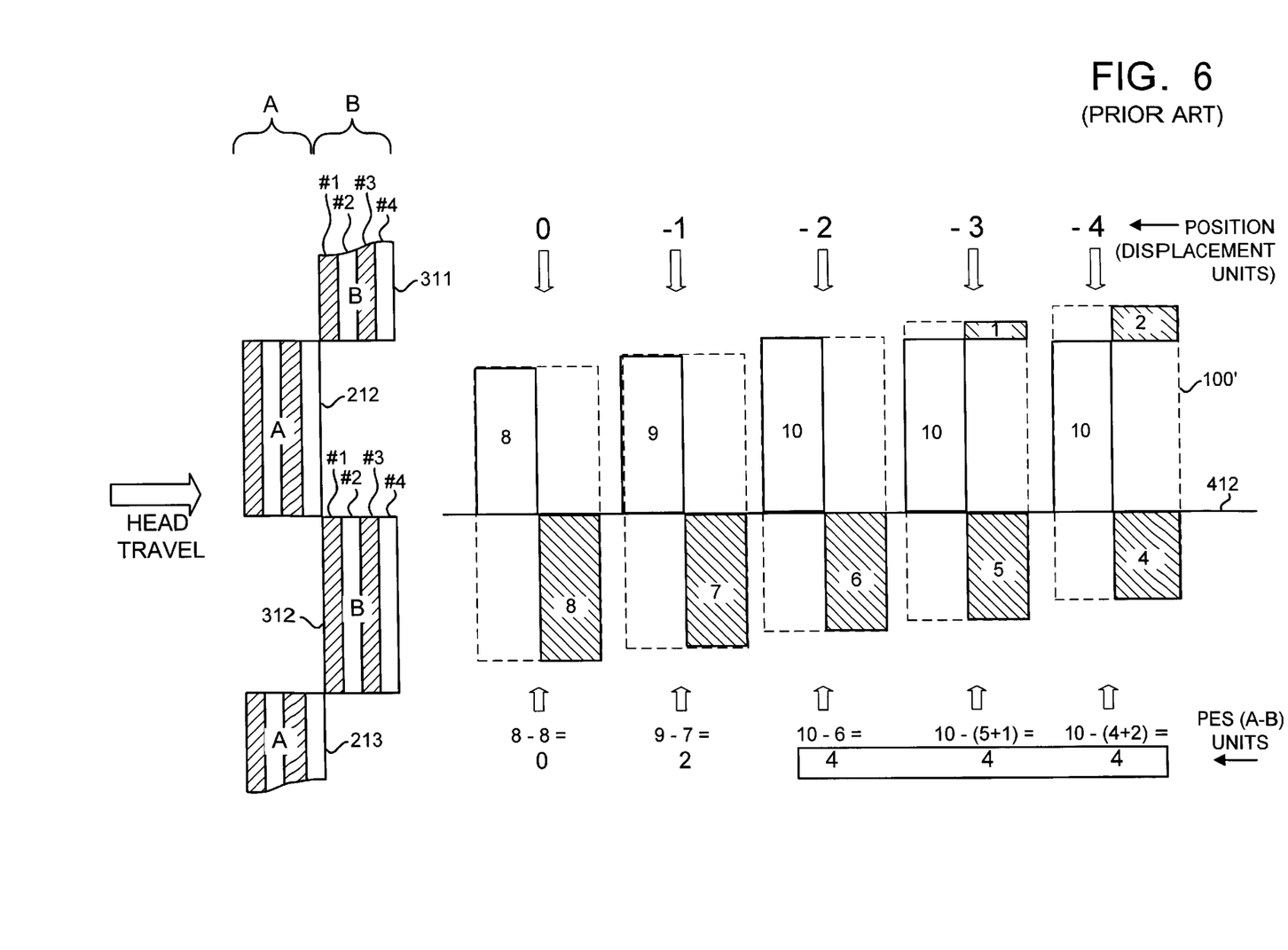
FIG. 6 shows a wide read transducer 100 in several positions relative to a conventional servo pattern wherein radially adjacent bursts (e.g. 311 and 312) have magnetic domains #1, #2, #3, #4 that were recorded in phase with one another such that when the read transducer 100' passes over both bursts 311, 312 in some offtrack positions (e.g. positions −3 and −4), the PES becomes nonlinear and no longer changes.

FIG. 1 schematically represents an older drive having only two angularly successive servo burst regions 250, 350 per servo sector, only two servo burst pairs (e.g. 212, 312) per data track (e.g. 412), and an inductive head in which the same transducer 200 (inductive gap) both reads and writes data. In this particular drive, the R/W transducer 200 records "100%" servo bursts 212, 312 that stretch from data track center to data track center. Each burst, therefore, is 100% as wide as the data track pitch. The servo bursts associated with each data track are typically designated as an A burst and a B burst with reference to their corresponding angular servo burst region 250, 350. As shown in FIG. 6, the A and B bursts 212, 312 define a burst pair centerline 412 that coincides with the data track centerline (not separately numbered). When the R/W transducer 200 is on track center in such arrangement, it detects equal signal amplitudes from the two circumferentially successive, radially offset A and B bursts such that A=B. If the R/W transducer 200 shifts one way or the other away from the burst pair centerline 412, an inequality exists between the signal amplitudes, such that A≠B. Assuming everything is linear, the inequality is proportional to the mechanical offset of the R/W transducer 200 relative to the burst pair centerline 412.

The servo pattern of FIG. 1 is subject to nonlinear regions because the R/W transducer "sees" too little. With only two bursts and one burst pair centerline per data track, the R/W transducer may be completely over one of the bursts and no longer pass over any part of the other burst if the transducer is displaced too far from the burst pair centerline. The 80% R/W head 200 of FIG. 1, for example, can only be displaced by a maximum of 40% of a data track pitch from the burst pair centerline 412 and still pass over at least a portion of both bursts 212, 312. This results in "blind spots" or "gaps" where the head position is ambiguous.

The industry subsequently added more 100% C and D bursts in order to fill the gaps between the A and B bursts. The C and D bursts are placed in "quadrature" with the A and B bursts in that the edges of the C and D bursts are aligned with the centers of the A and B bursts. With four 100% bursts A, B, C, D positioned in quadrature, there are two burst pair centerlines per data track pitch, i.e. one burst pair centerline every 50% of a data track pitch. The 80% R/W transducer 200, therefore, will always pass over an A/B pair or a C/D pair because it is always within 25% of a data track pitch from an A/B or C/D burst pair centerline.

Figure 2:
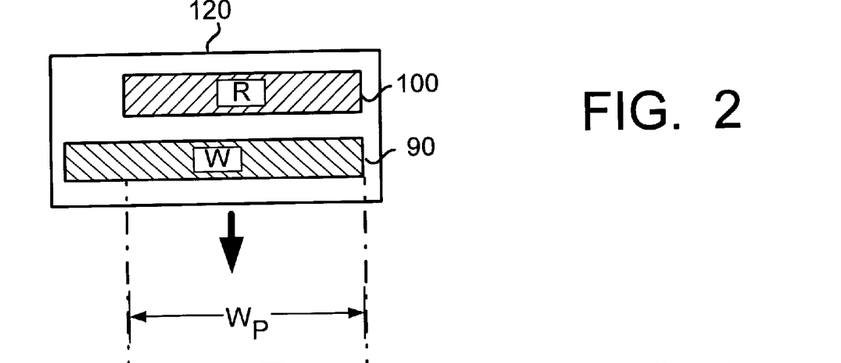
FIG. 2 is a conceptual plan view of an MR head 120 which comprises separate transducers, an inductive write transducer 90 that is typically about p80% of a track pitch and a magnetoresistive read transducer 100 having a physical width $W_P$ that is typically about 66% of a track pitch.

The industry recently began using magnetoresistive heads (MR heads) which contain two separate transducers—an old-style inductive transducer for writing and a magnetoresistive transducer for reading. FIG. 2 is a schematic plan view of a typical MR head 120 having an inductive write transducer 90 and a separate, magnetoresitive read transducer 100.

An MR head 120 can advantageously recover data in disk drives of higher areal density than is possible with an inductive head. However an MR head also presents a number of disadvantages. In particular, the separate read and write transducers 90, 100 are necessarily spaced apart from one another along the length of the supporting structure known as a "slider." As a result, their radial separation varies from ID to OD as the MR head 120 is moved in an arc by a swing-type actuator.

The drive industry presently compensates for the variable radial separation between the transducers 90, 100 by "microjogging" the read head 100 relative to a given burst pair centerline by an amount corresponding to the radial displacement at that cylinder. This jogging solution generally requires separate and distinct track following procedures for reading and writing. The drive can microjog when writing data or when reading data, but it is preferable to track follow on the burst pair centerline while writing and only jog when reading so that the data is consistently written to the same location. In a typical MR drive, therefore, the read transducer 100 track follows a burst pair centerline at the "null" position where the PES=0 and the write transducer 90 records the data track offset toward the ID or the OD by the amount of radial separation between the read and write transducers 90, 100 at this cylinder. For reading, the read transducer 100 is "micro-jogged" away from the null position of the burst pair centerline where the PES≠0, in order to align the read transducer 100 with the recorded data.

An MR head is sometimes called a "Write Wide/Read Narrow" head because the inductive write transducer 90 is usually wider than the magnetoresistive read transducer 100, as shown in FIG. 2. When the servo information is recorded so that the write transducer 90 is about 80% of a data track pitch for the reasons described above, the read transducer 90 is only about 66% of a data track pitch. The relatively narrow read transducer 100 physically limits the microjogging operation to one half of the read transducer's width, i.e. to about ±30%. As described in more detail below, however, the actual linear microjogging maximum is even less than 30%, because the magnetoresistive read transducer 100 has an uneven "microtrack profile" (i.e. is not uniformly sensitive across its width) and is subject to "side reading" (i.e. is sensitive to nearby transitions not actually under the transducer). Because of these factors, the typical 66% magnetoresistive read transducer 100 can only be microjogged by about ±20% of a data track pitch and still provide a servo signal that varies in adequate linear proportion to displacement from a burst pair centerline.

The drive industry increased the number of burst pair centerlines per data track pitch in order to reduce the linearity problem caused by the narrow linear width of the magnetoresistive read transducer 100. The additional burst pair centerlines are added by packing more servo bursts into the circumferential or radial dimensions of the disk. Adding more servo bursts in the radial dimension is generally preferred because it does not increase the angular width of the servo wedges and thereby reduce the area available for storing data. Adding more servo bursts in the radial dimension does, however, require bursts that are narrower than 100% of a data track pitch. For example, using four ⅔ track pitch bursts A, B, C, D on ⅓ track pitch offsets to create a ⅓, ⅓, ⅓ pattern of three burst pair centerlines per data track pitch ensures that the read head is always within ⅙th of a data track pitch (16.67%) from a burst pair centerline, i.e. well within the linear range of about ±20% for a typical magnetoresistive read transducer. This solution is not without cost.

The narrow bursts and additional burst pair centerlines reduces one linearity problem, but creates a new linearity problem by reducing the width of the servo bursts relative to the width of the read transducer while putting neighboring, radially adjacent servo bursts closer together. In particular, when reading a pair of narrow bursts with a wide transducer, a neighboring servo burst may undesirably affect the signal amplitude detected by the read transducer 100 in a given angular servo burst region. This is particularly true as the read transducer 100 is microjogged away from a burst pair centerline and moved closer to the neighboring, radially adjacent servo burst. Stated another way, as the read head is microjogged away from the B burst of an A/B burst pair centerline, it may begin to "see" the radially adjacent B burst. Given the ⅓, ⅓, ⅓ pattern described above, for example, the read head may be microjogged 15% of a data track pitch from the A/B burst pair centerline, involving a first B burst, and begin to see more and more of a second, radially adjacent B burst, thereby distorting the B portion amplitude signal used to provide the PES that is typically defined as (A−B)/(A+B).

Accordingly, there is a need for a disk drive that reduces or eliminates the detrimental effects of side reading. The present invention is applicable to a read transducer of any type, but is especially helpful in the context of MR heads which are necessarily jogged during operation, are often manufactured and used in a wide range of physical width distributions to keep costs down, are subject to increased side reading due to shielding, and are more likely to be used with narrow servo bursts needed to define additional burst pair centerlines.

SUMMARY OF INVENTION

The invention may be regarded as a disk drive having a sampled servo system controller and a disk wherein the disk has a plurality of angularly spaced servo wedges, each servo wedge having a plurality of angularly aligned servo burst fields that are radially adjacent to one another, each servo wedge further comprising a radially adjacent pair of the angularly aligned servo burst fields that are spaced apart by an erase area and wherein the radially adjacent pair of angularly aligned servo burst fields are recorded in opposing phase.

The invention may also be regarded as an improved magnetic disk drive having (1) a magnetic disk with first and second angularly successive servo burst regions that each contain a plurality of radially spaced servo bursts formed from a plurality of alternating magnetic domains which define a plurality of magnetic transitions; (2) a plurality of burst pair centerlines defined by a plurality of servo burst pairs where each servo burst pair comprises a first servo burst from the first servo burst region and a second servo burst from the second servo burst region; and (3) a read transducer which detects the magnetic transitions while passing over the first and second angularly successive servo burst regions and develops first and second signal amplitudes representative of a radial displacement between the read transducer and a burst pair centerline, the improvement comprising a 180 degree phase relationship between the alternating magnetic domains of each radially spaced servo burst in the first angularly successive servo burst region and the alternating magnetic domains of each radially adjacent servo burst in the first angularly successive servo burst region; and a 180 degree phase relationship between the alternating magnetic domains of each radially spaced servo burst in the second angularly successive servo burst region and the alternating magnetic domains of each radially adjacent servo burst in the second angularly successive servo burst region.

BRIEF DESCRIPTION OF THE DRAWINGS

The just summarized invention may best be understood with reference to the Figures of which.

BRIEF DESCRIPTION OF THE PREFERRED EMBODIMENTS

The present invention makes innovative use of a servo track writer (STW), a manufacturing fixture used to write servo information on the disks of an HDA. The STW mechanically moves the HDA's actuator to a given reference position precisely measured by a laser interferometer or other precision measurement device. The HDA is then driven to write the servo track information for that position. The servo track writing process of precisely measured displacement and servo track writing is repeated to write all required servo tracks across the disk.

The STW accurately controls phase alignment in order to maintain phase coherence between radially adjacent track ID fields. This phase alignment, in combination with a gray coding arrangement, permits the head to straddle two or more servo tracks while seeking or settling and still obtain reasonably valid track ID information. The present invention uses the STW's phase alignment capability in the unique context of radially adjacent servo bursts that are separated by an erase field, recording each such servo burst 180 degrees out of phase with each radially adjacent servo burst.

Figure 3:
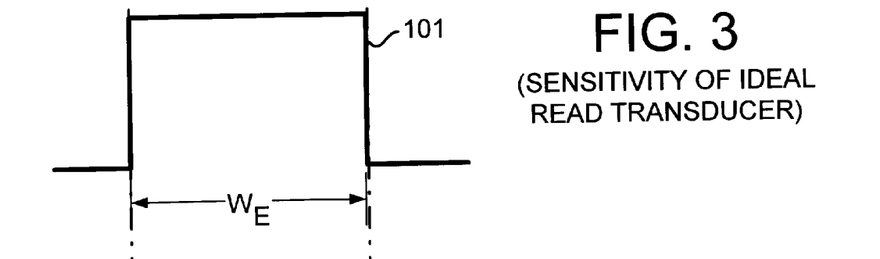
FIG. 3 is a "microtrack profile" or sensitivity plot 101 for an ideal read transducer wherein the transducer is uniformly sensitive across its width and is not subject to side reading such that its electrical width $W_E$ equals its physical width $W_P$.
Figure 4:
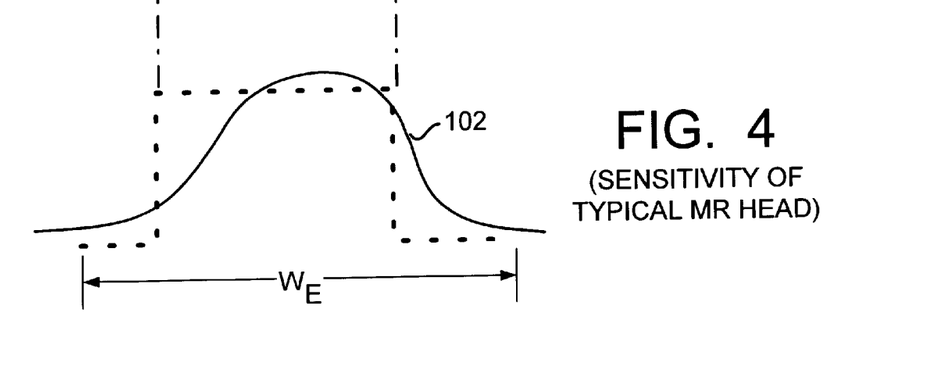
FIG. 4 is a microtrack profile 102 for a typical magnetoresistive read transducer 100 that is asymmetrical and subject to side reading such that its electrical width $W_E$ is significantly wider than its physical width $W_P$.
Figure 5:
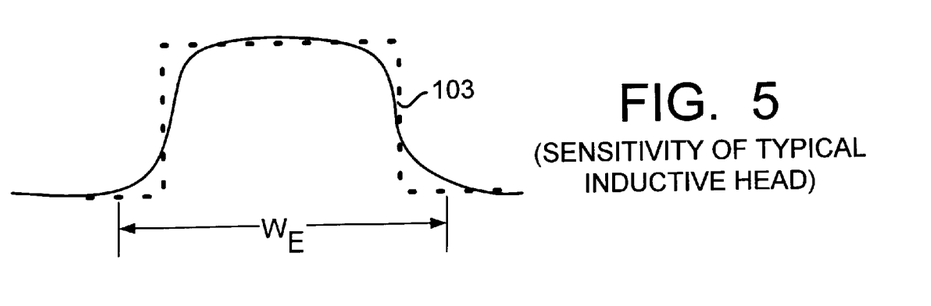
FIG. 5 is a microtrack profile 103 for a typical inductive read transducer 200 that is relatively symmetrical, but is still subject to side reading such that its electrical width $W_E$ is wider than its physical width $W_P$.

FIGS. 3, 4, and 5, respectively, illustrate the microtrack sensitivity profiles (also called crosstrack profiles) 101, 102, 103 for an ideal read transducer, for a typical magnetoresistive read transducer 100, and for a typical inductive R/W transducer 200. A microtrack profile is developed by measuring the signal amplitude while repeatedly passing the transducer 100, 200 over a narrow burst pattern of about 10–15% of a data track pitch and indexing the transducer 100, 200 in the radial direction in small "microtrack" portions.

FIG. 3 shows the "perfect" sensitivity profile 100 of an ideal transducer. Its sensitivity is uniform across the physical width $W_P$ of the transducer and drops abruptly to zero at either end such that the transducer's electrical width $W_E$ equals its physical width $W_P$. As shown in FIG. 4, however, the typical magnetoresistive read transducer 100 has a "microtrack" sensitivity profile 102 that is asymmetrical. The asymmetric sensitivity profile 102 of the magnetoresistive read transducer 100 makes it troublesome to implement the jogging process, described above, because the PES produced by the magnetoresistive read transducer 100 does not vary in linear proportion to the displacement from the position where the PES=0.

FIGS. 4 and 5 also show that both magnetoresistive and inductive read transducers 100, 200 have an electrical width WE that exceeds the their physical width $W_P$ because both are sensitive to magnetic energy that lies to either side. Consequently, under certain conditions, both types of read transducers may be improperly influenced by a neighboring, radially adjacent servo burst that would ordinarily not be "seen" by an ideal read transducer.

The electrical width WE of a read transducer depends on the transducer's physical width $W_P$ and its "side reading" sensitivity. The physical width $W_P$ varies given typical manufacturing tolerances. The width distribution for a batch of read transducers of 66% nominal width may vary from 60% to 75%, or more, depending on the manufacturer's controls. Moreover, because of side reading, the electrical width $W_E$ will always exceed the physical width $W_P$.

Side reading is particularly prevalent in current MR heads that use two pieces of relatively wide, soft magnetic material to shield the MR transducer (stripe). The shield pieces are wider because one of them also serves as a pole piece for the wider, inductive write transducer. These shields tend to make the read transducer 100 sensitive to magnetic energy located to either side. As a result of such side reading, the electrical width $W_E$ of most read transducers will exceed 66% (the width of a ⅔ wide servo burst) and some read transducers 100 may even exceed the width of a data track pitch, i.e. be greater than 100%.

Figure 7:
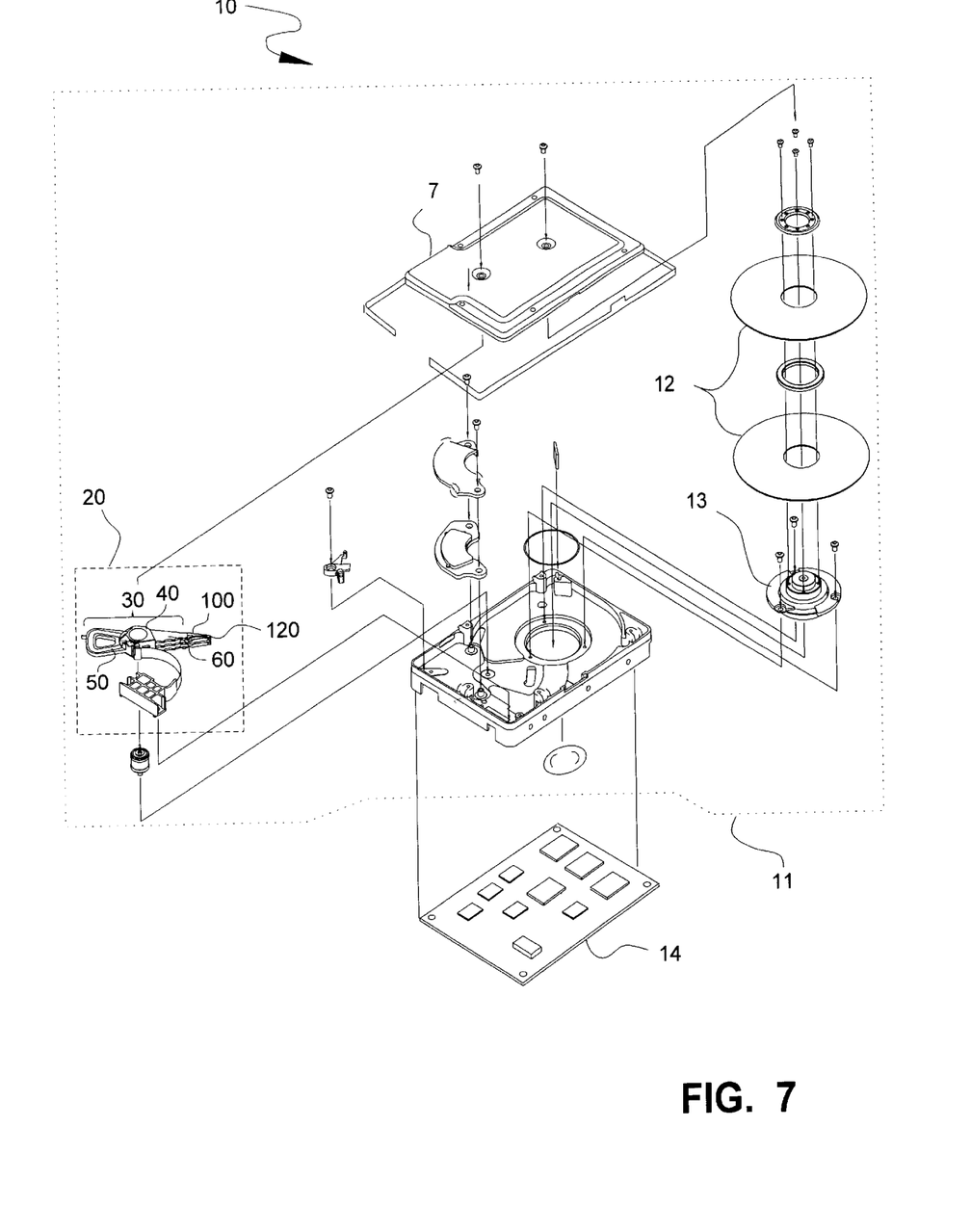
FIG. 7 is an exploded perspective view of a magnetic disk drive 10 having a head disk assembly 11 (HDA) including a head stack assembly 20 (HSA) which carries a magnetoresistive head 120 (MR head) over concentric data tracks, servo tracks, and associated servo bursts on the surface of a disk 12.

FIG. 7 shows the principal components of a disk drive 10 in which a burst phasing technique according to the present invention may be implemented. The disk drive 10, having integrated drive electronics, comprises a head disk assembly (HDA) 11 and a controller circuit board 14.

The HDA 11 of FIG. 7 comprises a magnetic disk 12 (2 shown), a spindle motor 13 for rapidly rotating the disk 12, and a head stack assembly 20 located next to the disk 12.

The head stack assembly 20 comprises a swing-type actuator assembly 30 having a voice coil 50, an actuator body 40, and an actuator arm 60. At least one head gimbal assembly 100 extends from each actuator arm 60 and carries a head such as a magnetoresistive head (MR head) 120 (see FIG. 2) over the disk 12.

The head stack assembly 20 is located so that the head 120 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 140 for each surface of each disk 12, the head gimbal assemblies 100 supported by multiple actuator arm 60.

Figure 8:
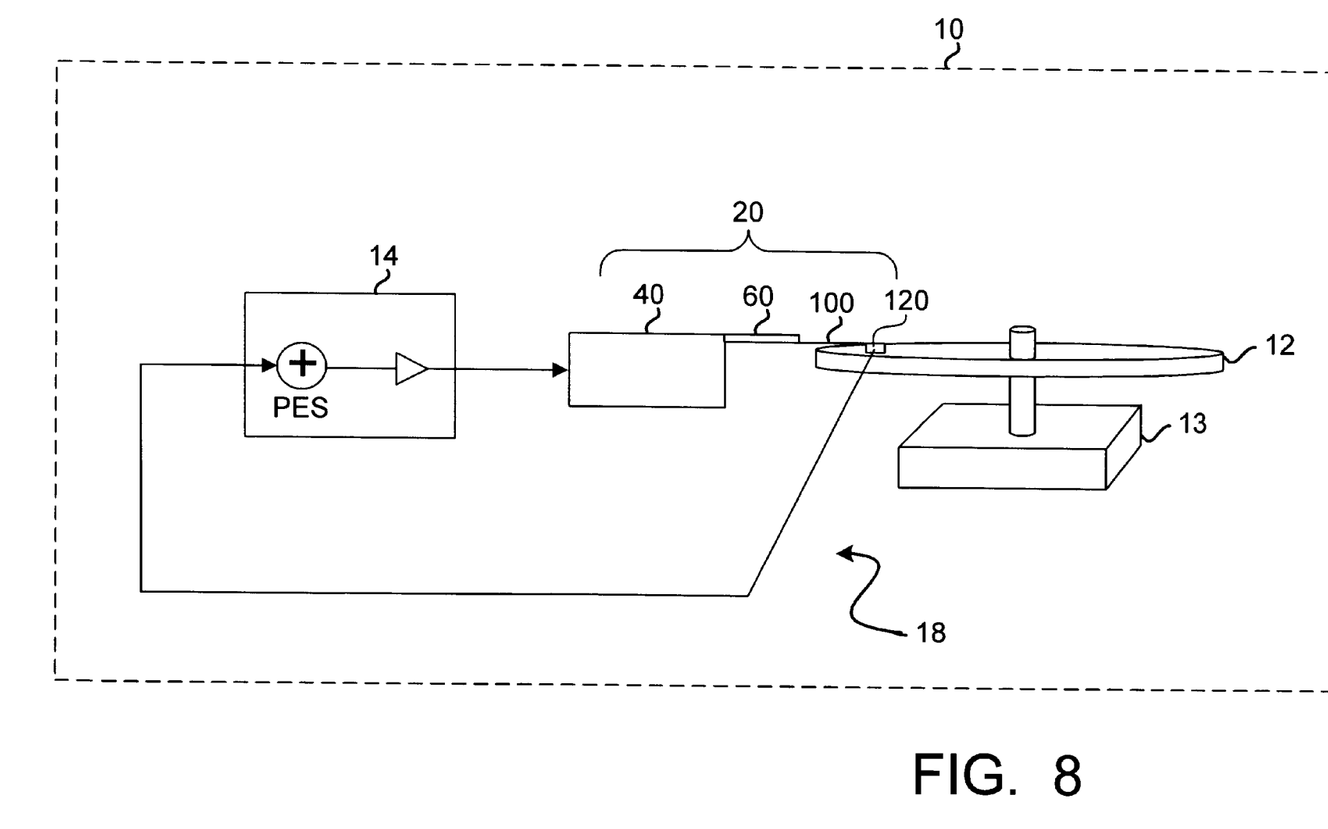
FIG. 8 is a schematic, block diagram of a servo control loop 18 used to position a head 120 over a surface of a disk 12 in the disk drive 10 of FIG. 7.

FIG. 8 is a schematic, block diagram of a servo control loop 18 used to position a transducer head 120 over a surface of a disk 12 in the disk drive 10 of FIG. 8. As suggested therein, servo electronics within the controller circuit board 14 control the actuator 20 based on servo signals fed back from the transducer head 120. A detailed description of the servo control loop is unnecessary because its general operation is well known in the industry.

As explained above, an embedded, sampled, or sectored servo is presently popular. In such an arrangement, as shown in FIG. 1, groups or "bursts" of magnetic transitions are recorded in a radially displaced fashion within angularly successive servo burst regions 250, 350 making up a servo sector. Where only two bursts are used per data track, such bursts are usually designated as the "A" burst and the "B" burst. The radial displacement in such case places the A burst to one side of the burst pair centerline and the B burst to the other side. The A and B bursts are circumferentially displaced from one another since they are contained in the angularly successive servo burst regions 250, 350. Accordingly, the head passes over the A burst and then over the B burst. If the head is aligned with the burst pair centerline, then the head will pass over equal amounts of the A and B bursts and the servo electronics will develop a Position Error Signal (PES) equal to zero. If the head is displaced from the centerline, then the head will pass over more of the A burst or over more of the B burst so that the PES will be nonzero, the sign of the PES indicating the direction of displacement. The PES is used by the servo electronics to attain and then maintain a desired position.

FIG. 2 schematically shows a typical MR head 120 wherein the read and write transducers are separate and are typically of different widths. The inductive write transducer 90 is typically about 80% of a track pitch and the magnetoresistive read transducer 100 has a physical width $W_P$ that is typically about 66% of a track pitch. As explained above with reference to FIG. 4, the microtrack profile of the typical MR head 120 is asymmetric and extends to either side of the read transducer 100.

Figure 9:
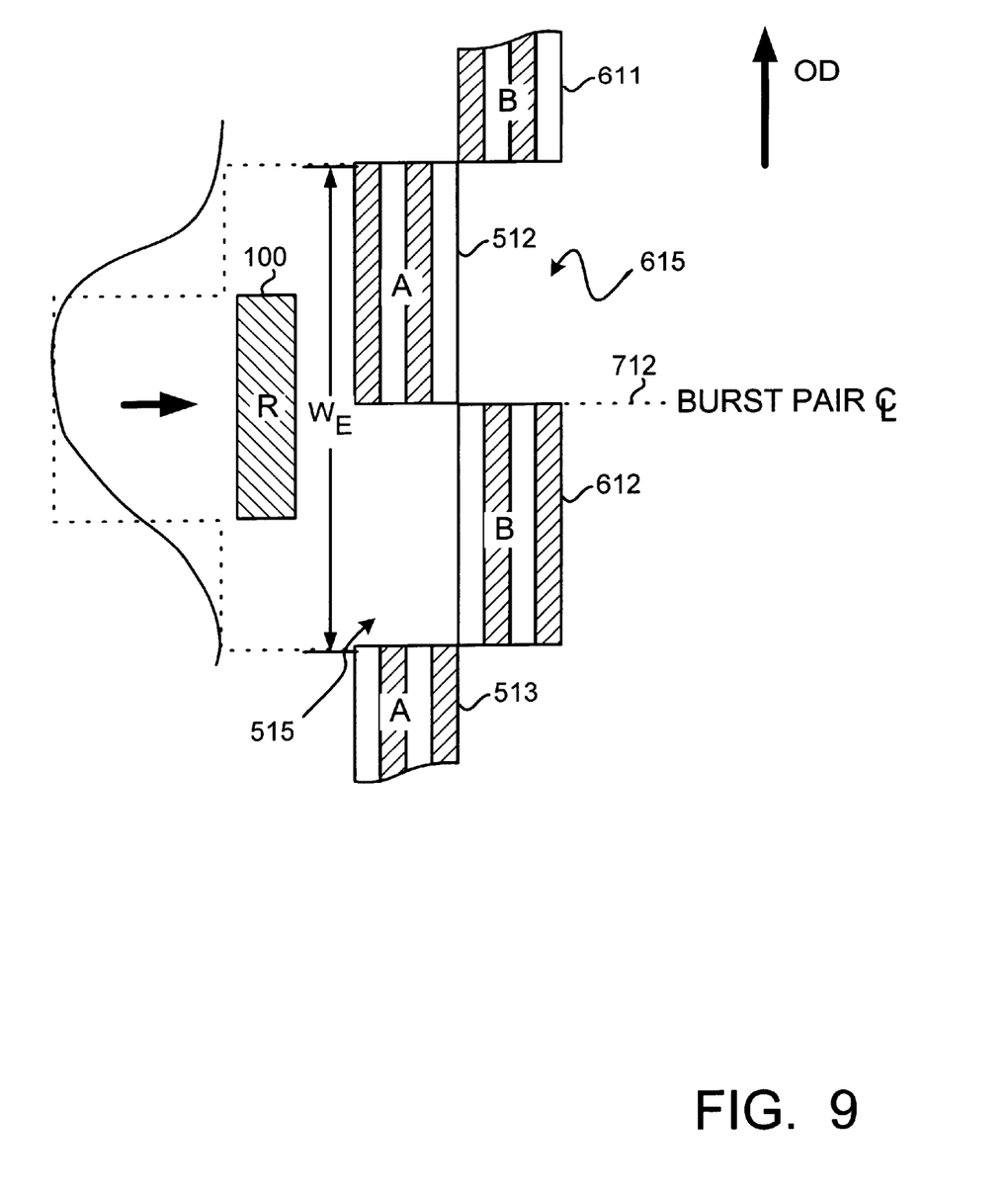
FIG. 9 shows a magnetoresistive read transducer 100 and the corresponding microtrack sensitivity profile of FIG. 4 traveling on a burst pair centerline 712 defined by an A burst 512 and a B burst 612 having radially adjacent bursts 611, 513 that were recorded in accordance with the present invention.
Figure 10:
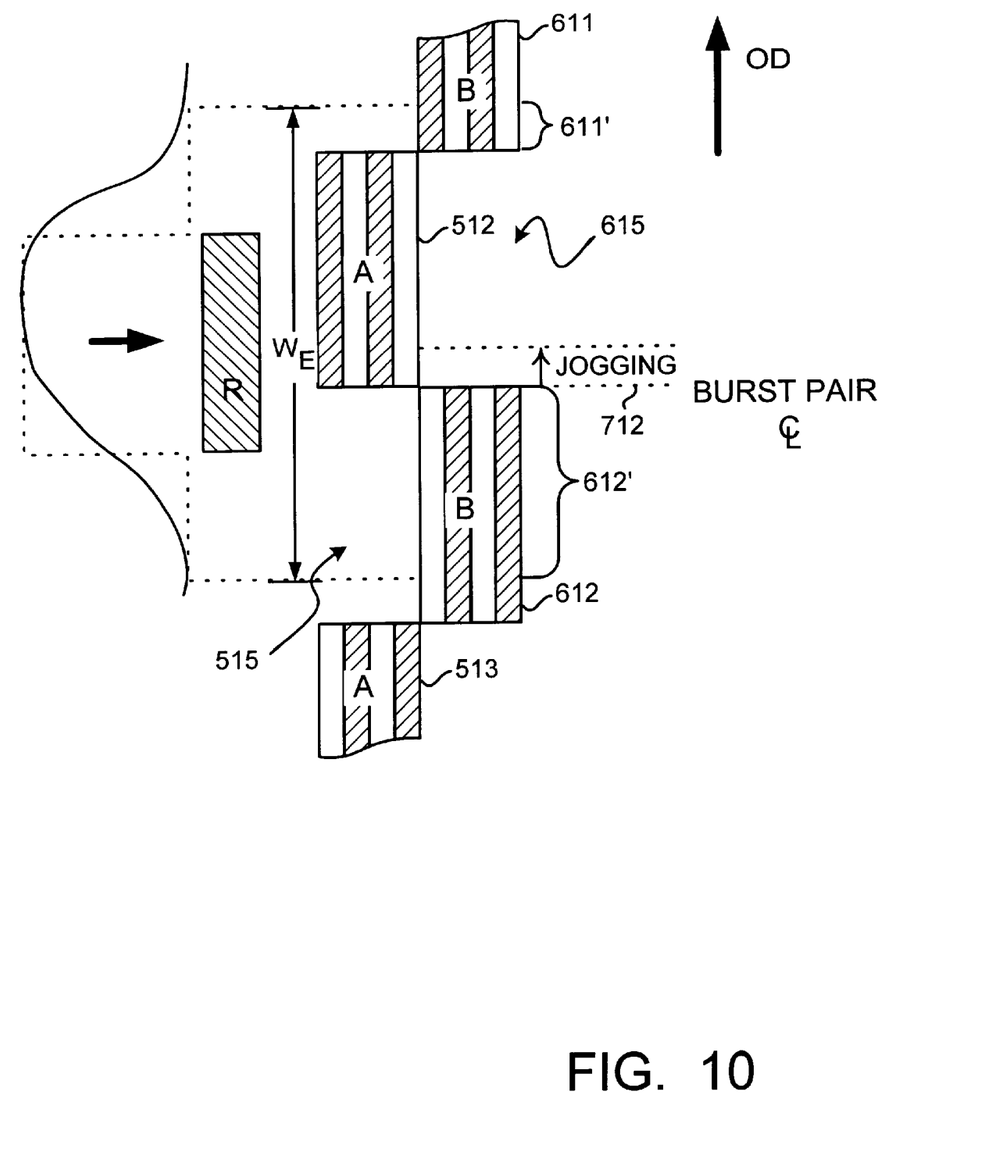
FIG. 10 is similar to FIG. 9 except that the read transducer 100 has been jogged away from the burst pair centerline 712, toward the OD in this case, such that it begins to "see" a radially adjacent B burst 611 in addition to the B burst 612 which defines the burst pair centerline 712.

FIGS. 9 and 10 show a read transducer 100 traveling along relative to a burst pair centerline 712 defined by an A burst 512 and a B burst 612. Radially adjacent bursts 513 and 611 are spaced apart from A burst 512 and B burst 612 respectively by erase areas 515 and 615, created during the process of servowriting the disk. In both Figures, the read transducer 100 is shown adjacent to and in alignment with its corresponding microtrack profile of FIG. 4 in order to emphasize that its electrical width $W_E$ may span radially adjacent servo bursts 611 or 613 in addition to the two servo bursts 512, 612 which define the current burst pair centerline 712. In FIG. 9, the read transducer 100 is traveling right on the burst pair centerline 712 and its electrical width WE is passing only over the defining bursts 512, 612. In FIG. 10, however, the read transducer 100 has been jogged toward the OD such that the transducer 100 will electrically, although not physically, pass over a portion 611' of a radially adjacent B burst 611 in addition passing over all of the defining bursts 512, and a portion 612' of defining burst 612.

Figure 11:
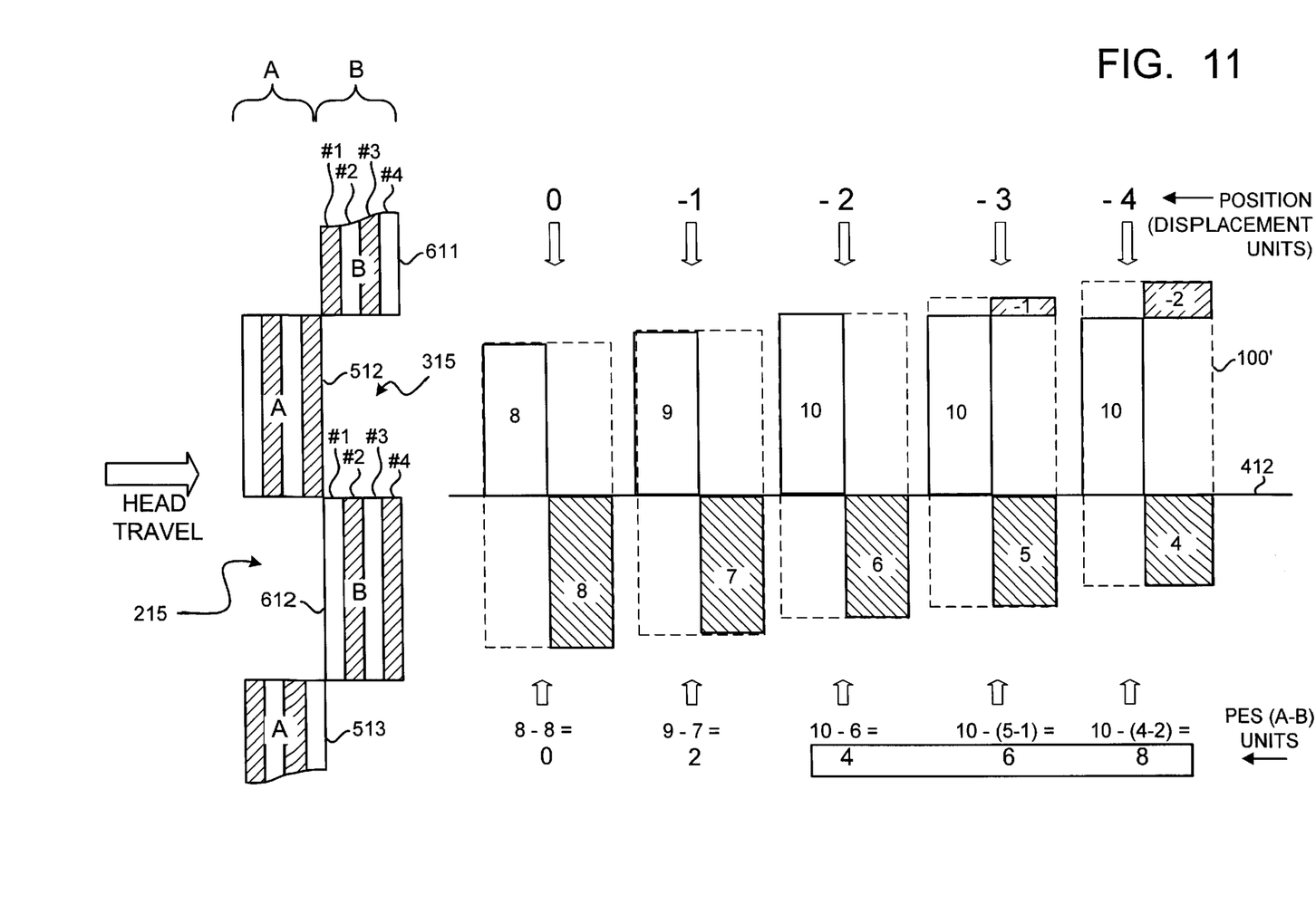
FIG. 11 shows a wide read transducer 100' in several positions relative to a servo pattern according to the present invention wherein radially adjacent bursts (e.g. 611, 612) have magnetic domains #1, #2, #3, #4 which were recorded 180 degrees out of phase with one another such that the PES continues to change in linear proportion to displacement even when the read transducer 100' passes over both bursts 611, 612 in an offtrack position (e.g. positions −3 and −4)

If the servo bursts comprise domains that are recorded in a conventional fashion, as shown in FIG. 6, then the signal amplitude from the electrically passed over portion 611' of the radially adjacent B burst 611 would simply be added to the signal amplitude from the physically and electrically passed over portion 612' of the B burst 612. If however, the servo bursts were recorded in accordance with the present invention, as shown in FIGS. 9, 10 and 11, then the portion 611' is beneficially out of phase with the portion 612'. As a result, the contribution from the electrically passed over portion 611' is not erroneously added to the PES, but rather is subtracted therefrom.

In order to simplify the explanation of the present invention, we will us a hypothetical, wide-reading transducer head 100' that is physically wide but has no side sensitivity.

FIG. 6 shows a hypothetical head 100' passing over two radially adjacent A bursts 212, 213, and two radially adjacent B bursts 311, 312 that were recorded in the conventional manner with the magnetic domains of each radially adjacent burst in phase with all other radially adjacent bursts. Typical servo bursts contain about eleven magnetic domains and ten transitions. For the sake of simplicity, however, the servo bursts of FIG. 6 are shown with only four magnetic domains #1, #2, #3, #4. As suggested by the cross hatching in the two radially adjacent B bursts 311, 312, the magnetic domains #1, #2, #3, #4 are electrically in phase with one another in that the #1 domains were both recorded with the write current flowing in a first direction, the #2 domains were both recorded with the write current flowing in a second opposite direction, the #3 were both recorded with the write current again flowing in the first direction, and the #4 domains were both recorded with the write current again flowing in the second direction.

The problem with the servo pattern of FIG. 6 is that a wide reading transducer 100' may begin to develop a counterproductive burst amplitude signal from a radially adjacent servo burst when it is offtrack relative to the burst pair centerline 412. FIG. 6 specifically shows the burst amplitude signals developed by the transducer head 100 when it passes over the servo bursts in five different positions 0, –1, –2, –3 and –4. In positions 0, –1, and –2 the transducer 100' passes over a portion of the A burst 212 and a portion of the B burst 312 in proportionally varying amounts which result in linear PES (A–B) values of 0, 2 and 4 PES units. If the transducer 100' is positioned farther, however, such as at positions –3 and –4, then it begins to read the radially adjacent B burst 311 and the PES no longer changes, as shown in FIG. 6 and corresponding FIG. 6A. As the transducer 100' moves over the radially adjacent B burst 311, it moves away from the original B burst 312.

Figure 6A:
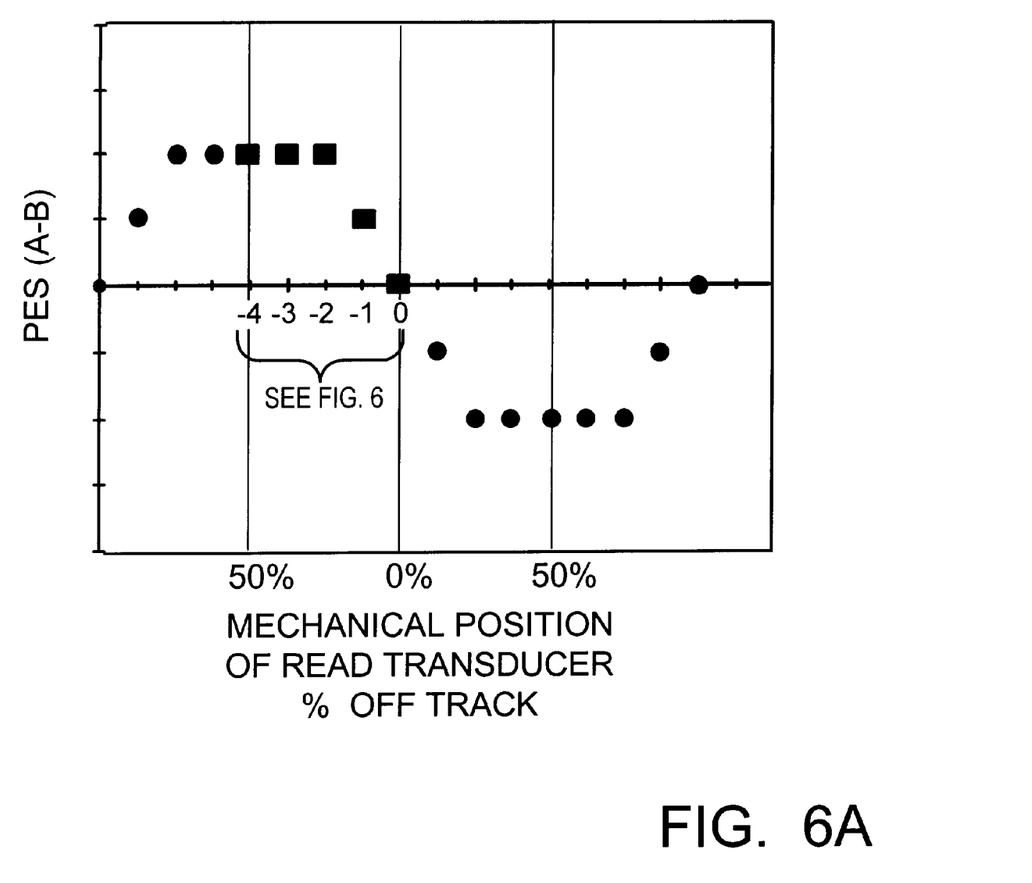
FIG. 6A is a plot of PES versus mechanical position for the conventional servo pattern of FIG. 6 with data points corresponding to the exemplary head positions and resulting PES values of FIG. 6 emphasized for clarity.

FIG. 6A shows the PES values and transducer displacement as a percentage of the servo track pitch for the servo pattern of FIG. 6. As shown, there is a limited amount of offtrack movement before the read transducer 100' no longer develops a PES signal that is proportional to displacement. The five data points corresponding to the five head positions of FIG. 6 are emphasized for clarity.

FIG. 11, in contrast with FIG. 6, shows two radially adjacent A bursts 512, 513, and two radially adjacent B bursts 611, 612 and erase areas 515, 615 that were recorded in accordance with the present invention. Here, the bursts were uniquely recorded with "burst phasing" by alternating the write current for the component domains #1, #2, #3, #4 of each radially adjacent servo burst. In particular, as shown in FIG. 11, the #1 domains of the B bursts 611, 612 are 180 degrees electrically out of phase with one another, as are the #2, #3, and #4 domains. This opposite, every other burst, domain phasing relationship is established between all radially adjacent bursts by recording every other radially adjacent servo burst out of phase with its predecessor. In other words, all odd bursts are recorded with their component domains in one phase order and all even burst are recorded with their component domains in an opposite phase order, or vice versa.

Figure 11A:
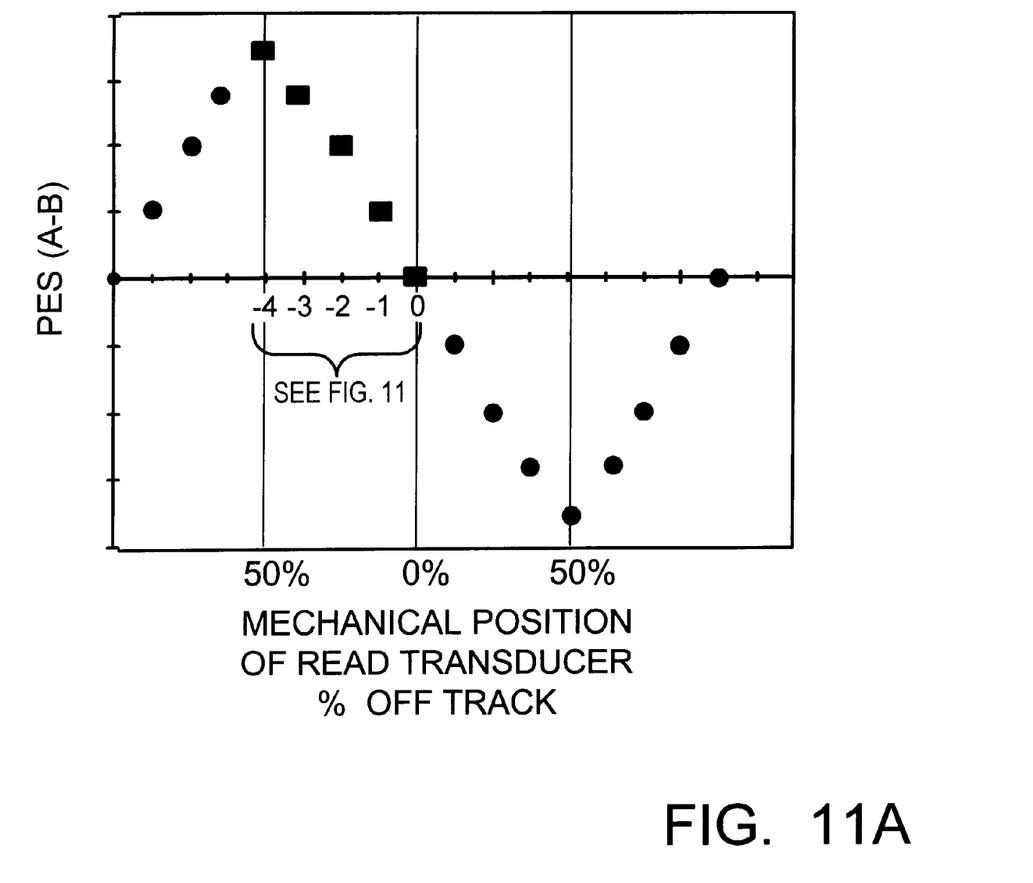
FIG. 11A is a plot of PES versus mechanical position for the innovative servo pattern of FIG. 11 with data points corresponding to the exemplary head positions and resulting PES values of FIG. 11 emphasized for clarity.

FIG. 11A is a graph of the PES developed as a function of mechanical offtrack position of the read transducer 100' given the innovative servo burst pattern of FIG. 11. As shown, the burst phasing aspect of the present invention permits the system to develop a PES that varies ideally as a linear function of mechanical position from −50% to +50% of a servo track pitch.

The benefits of the present invention may be further appreciated with reference to FIGS. 12–15.

Figure 12:
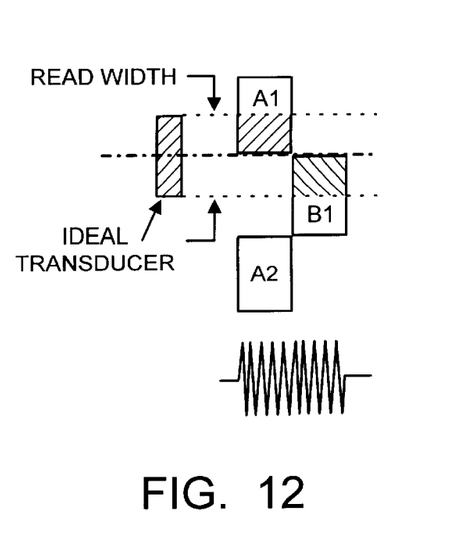
FIGS. 12–13 are schematic diagrams showing the burst amplitude signals developed by an ideal transducer in an ontrack and 50% offtrack position.

In FIG. 12, an ideal transducer that has no side sensitivity and is precisely the same width as the servo bursts A1 and B1 is traveling along the burst pair centerline. As shown in FIG. 12, when the ideal transducer passes over the servo burst A1, B1 the transducer detects corresponding burst signals of equal amplitude as shown directly below the bursts.

Figure 13:
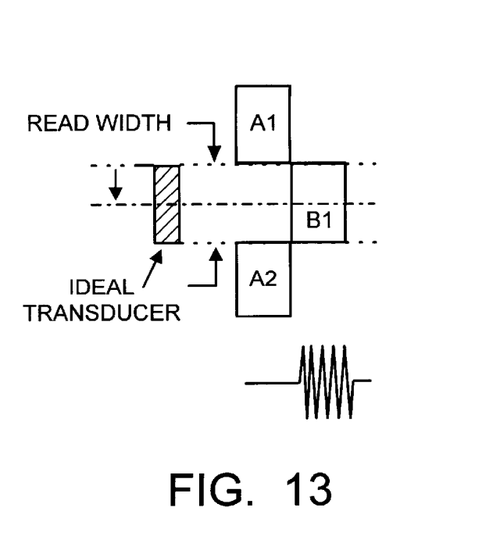

In FIG. 13, the ideal transducer 100' has been moved offtrack by 50% of a servo track pitch such that the ideal transducer is passing completely over burst B1 and not at all over burst A1 or radially adjacent burst A2. As a result, the ideal transducer develops the amplitude signals shown below the bursts the first of which is correctly flat.

Figure 14:
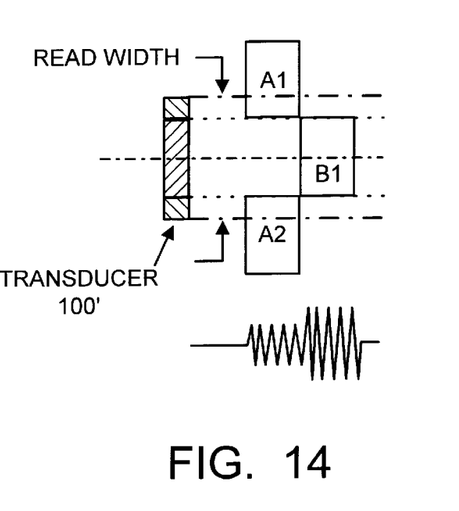
FIGS. 14–15 are schematic diagrams showing the burst amplitude signals that are incorrectly developed by a wide transducer given normal burst phasing and that are correctly developed given burst phasing according to the present invention.

In FIG. 14, a real wide-reading transducer 100' is traveling over conventional servo bursts and is positioned at the same 50% offtrack amount as shown in FIG. 13. Here, however, because of the side sensitivity of the transducer 100', it detects portions of radially adjacent bursts A1 and A2. Accordingly, the transducer 100' will develop the amplitude signals shown below the conventional servo bursts. As can be appreciated by comparing the burst signals of FIG. 14 with the correct burst signals of FIG. 13, the servo control system would incorrectly determine the transducer's position if it relied on the signals developed by the wide-reading transducer 100 given normal burst phasing.

Figure 15:
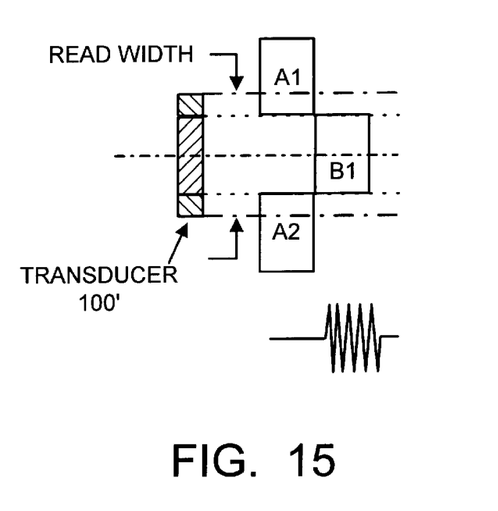

In FIG. 15, however, servo bursts with burst phasing in accordance with the present invention are used. In this case, as the transducer 100' travels past the servo bursts A1, A2, the portion of the amplitude signal developed by burst A1 is completely canceled by the portion of the amplitude signal developed by burst A2. As a result, the burst amplitude signals appear as they should.

The present invention uniquely develops the two amplitude signals that are used in the standard position error formula (A−B) in a conventional fashion from two bursts (e.g. $A_n$, $B_n$) and in an innovative fashion from more than two servo bursts (e.g. $B_{n-1}$, $A_n$, $B_n$ or $A_n$, $B_n$, $A_{n+1}$). Significantly, no special firmware is required. Instead, due to the alternating phase relationship between the magnetic domains of radially adjacent bursts, if a third burst that is radially adjacent to one of the two primary bursts comes into a read transducer's field of view due to side-reading, the contribution from that third burst is given the appropriate polarity in order to continue developing a useful position error signal.

We claim:

1. A disk drive having a sampled servo system controller and a disk wherein the disk has a plurality of angularly spaced servo wedges, each servo wedge having a plurality of angularly aligned servo burst fields that are radially adjacent to one another, each servo wedge further comprising:

a radially adjacent pair of the angularly aligned servo burst fields being spaced apart by an erase area; and the radially adjacent pair of angularly aligned servo burst fields being recorded in opposing phase.

2. The disk drive of claim 1 wherein the erased area is equivalent in width to a servo burst field.

3. The disk drive of claim 1 wherein the plurality of angularly aligned servo burst fields in each servo wedge comprises four servo burst fields.

4. The disk drive of claim 1 wherein the opposing phase is 180 degrees.

5. The disk drive of claim 1 wherein the erase area and the servo burst field are of equal width.

6. A magnetic disk drive having (1) a magnetic disk with first and second angularly successive servo burst regions that each contain a plurality of radially spaced servo bursts formed from a plurality of alternating magnetic domains which define a plurality of magnetic transitions, the first angularly successive servo burst regions containing first radially spaced servo bursts that are spaced apart by an erase area and the second angularly successive servo burst regions containing second radially spaced servo bursts that are spaced apart by an erase area; (2) a plurality of burst pair centerlines defined by a plurality of servo burst pairs where each servo burst pair comprises a first servo burst from the first servo burst region and a second servo burst from the second servo burst region; and (3) a read transducer which detects the magnetic transitions while passing over the first and second angularly successive servo burst regions and develops first and second signal amplitudes representative of a radial displacement between the read transducer and a burst pair centerline, the improvement comprising:

a 180 degree phase relationship between the alternating magnetic domains of each radially spaced servo burst in the first angularly successive servo burst region and the alternating magnetic domains of each radially adjacent servo burst in the first angularly successive servo burst region; and a 180 degree phase relationship between the alternating magnetic domains of each radially spaced servo burst in the second angularly successive servo burst region and the alternating magnetic domains of each radially adjacent servo burst in the second angularly successive servo burst region.

7. The magnetic disk drive of claim 6 further comprising a plurality of servo sectors that are embedded with and interspersed among the data, each servo sector comprising first and second angularly successive servo burst regions.

* * * * *